US006773169B2

United States Patent
Ebeling et al.

(10) Patent No.: US 6,773,169 B2
(45) Date of Patent: Aug. 10, 2004

(54) METHOD FOR COUPLING A SURFACE-ORIENTED OPTO-ELECTRONIC ELEMENT WITH AN OPTICAL FIBER AND OPTO-ELECTRONIC ELEMENT FOR CARRYING OUT SUCH A METHOD

(75) Inventors: Karl-Joachim Ebeling, Ulm (DE); Jochen Heinen, Haar (DE); Christian Hanke, München (DE)

(73) Assignee: Infineon Technologies AG, Munich (DE)

( * ) Notice: Subject to any disclaimer, the term of this patent is extended or adjusted under 35 U.S.C. 154(b) by 132 days.

(21) Appl. No.: 10/233,695

(22) Filed: Sep. 3, 2002

(65) Prior Publication Data

US 2003/0053764 A1 Mar. 20, 2003

(30) Foreign Application Priority Data

Aug. 31, 2001 (DE) ......................................... 101 43 781

(51) Int. Cl.[7] ................................................. G02B 6/36
(52) U.S. Cl. ............................... 385/88; 385/92; 385/52
(58) Field of Search ............................... 385/49, 52, 80, 385/88–90, 92–94

(56) References Cited

U.S. PATENT DOCUMENTS 4,269,648 A      5/1981  Dakss et al. ................... 385/35
4,501,637 A  *  2/1985  Mitchell et al. ............... 438/27
4,653,847 A  *  3/1987  Berg et al. ..................... 385/79
5,658,966 A  *  8/1997  Tsukamoto et al. ........... 522/99
6,524,017 B2 *  2/2003  Lecocq et al. ................. 385/88
6,642,068 B1 *  11/2003 Hayes et al. ................... 438/21

* cited by examiner

Primary Examiner—Brian Healy
Assistant Examiner—Kevin S. Wood
(74) Attorney, Agent, or Firm—Laurence A. Greenberg; Werner H. Stemer; Ralph E. Locher

(57) ABSTRACT

A method for coupling a surface-oriented opto-electronic element, particularly, a VCSEL laser diode, an LED, or a photodiode, with an optical fiber and an opto-electronic element for carrying out such a method, the opto-electronic element having a rotationally symmetrical protruding structure disposed symmetrically with respect to the optically active zone of the opto-electronic element, includes the steps of wetting the butt of the fiber and/or the protruding structure of the opto-electronic element with a transparent adhesive, moving the opto-electronic element and/or the fiber toward each other such that a substantially frictionless movement of at least one of the element and fiber can occur, waiting for a self-centering of the fiber and the protruding portion; and waiting for or bringing about a hardening of the adhesive for purposes of fixing the now-centered configuration between the fiber and the protruding portion.

16 Claims, 2 Drawing Sheets

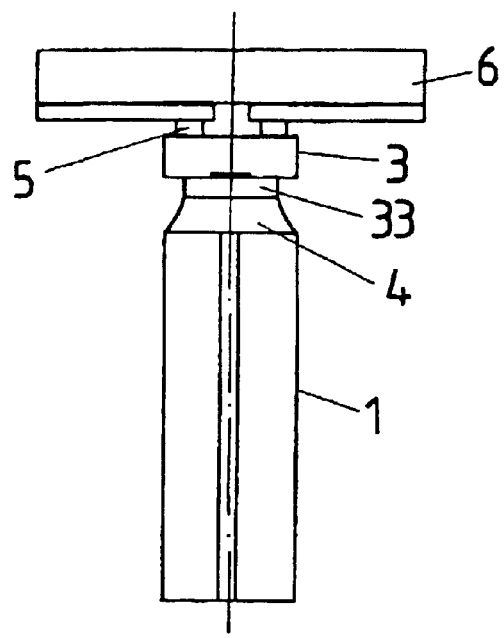
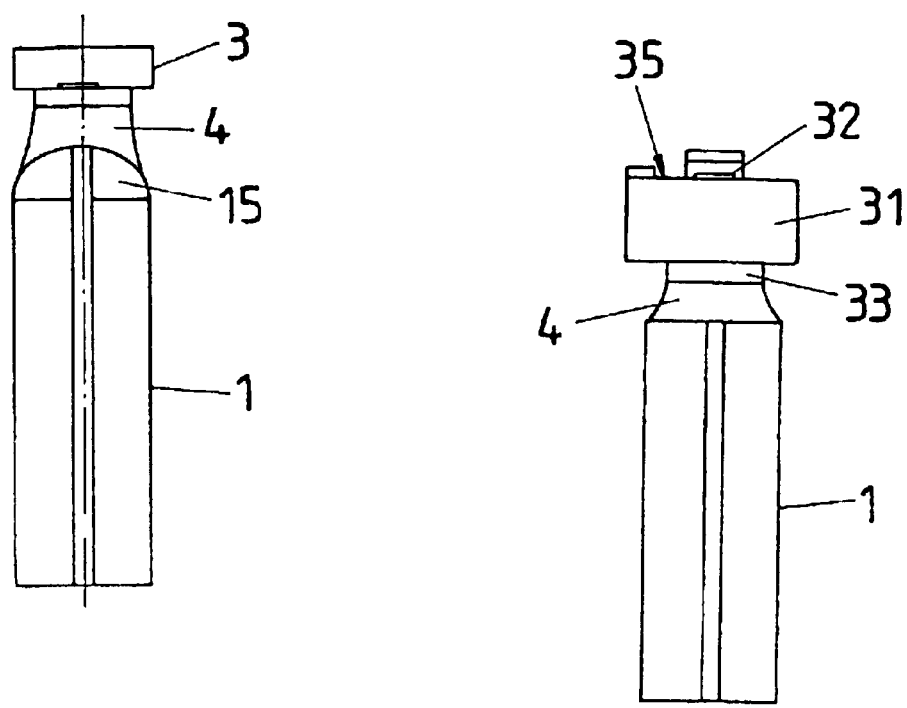

METHOD FOR COUPLING A SURFACE-ORIENTED OPTO-ELECTRONIC ELEMENT WITH AN OPTICAL FIBER AND OPTO-ELECTRONIC ELEMENT FOR CARRYING OUT SUCH A METHOD

BACKGROUND OF THE INVENTION

FIELD OF THE INVENTION

The present invention relates to a method for coupling a surface-oriented opto-electronic element with an optical fiber, and an opto-electronic element for carrying out such a method.

The coupling between an opto-electronic element or chip and an optical fiber, particularly, a monomode fiber, represents a complex problem because the two components must be aligned relative to one another to achieve a high coupling performance with high efficiency in the $\mu$m or sub-$\mu$m range. Prior art methods for producing a coupling include, on one hand, a coupling technique with lenses or other beam transforming elements, and on the other hand, direct techniques, referred to as butt coupling methods.

Generally, an optical fiber is aligned relative to an opto-electronic chip for purposes of achieving a high coupling performance by an active aligning technique, i.e., an experimental determination of the favorable positioning of the optical fiber and the opto-electronic chip. Active aligning is disadvantageously time consuming and cost-intensive.

Another prior art technique is what is referred to as passive alignment, which provides for the utilization of positioning aids that are provided at one of the coupling partners or at a coupling device. The positioning aids make possible a passive alignment between an opto-electronic chip and an optical fiber that is to be coupled therewith, but the provision of the positioning aids is associated with an additional outlay and additional costs.

SUMMARY OF THE INVENTION

It is accordingly an object of the invention to provide a method for coupling a surface-oriented opto-electronic element with an optical fiber and opto-electronic element for carrying out such a method that overcomes the hereinafore-mentioned disadvantages of the heretofore-known devices and methods of this general type and that makes it possible to connect the two parts easily while providing a high coupling performance.

With the foregoing and other objects in view, there is provided, in accordance with the invention, a method of coupling an element with a fiber, including the steps of providing an optical fiber having a fiber rotational axis and a fiber butt, providing a surface-oriented opto-electronic element having an optically active zone, a rotational axis, and a rotationally symmetric protruding structure symmetrically disposed with respect to the optically active zone, wetting at least one of the fiber butt and the protruding structure with a transparent adhesive, moving the element and the optical fiber toward each other to spread the adhesive therebetween, disposing at least one of the element and the fiber to enable a substantially frictionless movement of the fiber perpendicular to the rotational axis of the element and perpendicular to the fiber rotational axis, waiting for the fiber and the protruding portion to self-center, and one of waiting for and bringing about a hardening of the adhesive to fix the now-centered configuration between the fiber and the protruding portion.

Accordingly, it is inventively provided that, first, the butt of an optical fiber and/or a rotationally symmetric protruding structure of an opto-electronic element are wetted with a transparent adhesive. The rotationally symmetrical structure is constructed symmetrical to the optically active zone of the opto-electronic element. Next, the two elements that are to be coupled are moved toward each other, whereby the adhesive between the front side of the fiber and the protruding structure spreads. The opto-electronic element and/or the fiber are disposed so as to allow substantially frictionless movement perpendicular to the rotational axis of the opto-electronic element, i.e., perpendicular to the rotational axis of the fiber. Such a configuration makes possible an automatic positioning of the two coupling elements relative to one another. The element automatically positions itself relative to the optical fiber and vice-versa by virtue of the surface tension and the capillary effect of the adhesive.

A rotationally symmetrical structure in the sense of the invention is any structure that is projected on itself given rotation about at least one angle not equal to 360°. In other words, if there exists a line g and at least one angle a, such that the body is projected onto itself given rotation about the line g and the angle a, then the body is rotationally symmetric. In particular, this includes not only circular and annular structures but also polygons, particularly, triangles, quadrilaterals, pentagons, etc. Rotational symmetry in the sense of the invention is, thus, identified with a structure whose center of gravity is on center.

What is meant by substantially frictionless movement perpendicular to the axis of rotation of the opto-electronic element or perpendicular to the rotational axis of the fiber is movement that is opposed by such slight friction that there is no impediment to alignment based upon the surface tension and capillary effect of the adhesive. This is the case, particularly, with a floating configuration of the element. Specifically, a symmetrical configuration of the rotationally symmetric protruding structure relative to the optically active zone means that the protruding structure and the optically active zone have a common center of gravity (i.e., one situated on a common axis of rotation). The optically active zone is, preferably, also configured rotationally symmetrical.

Due to the rotational symmetry of the protruding structure, a positioning is achieved by bringing the rotational axis of the protruding structure into congruence with the rotational axis of the (likewise rotationally symmetrical) optical fiber. Because the protruding structure is disposed symmetrical to the optically active zone of the opto-electronic element, and this is, therefore, concentrically aligned relative to the protruding structure, the rotational axis of the optically active zone becomes aligned precisely on the rotational axis of the optical fiber. Such alignment produces the highest possible coupling performance.

After the successful self-centering of the protruding portion, i.e., the optically active zone, and the optical fiber, the adhesive is hardened. Hardening can occur automatically with the passage of time, or, alternatively, by a separate curing aid such as UV irradiation. The ideal positioning between the two coupling partners is fixed in time and space by the curing of the adhesive. As a result, the optically active zone or surface of the opto-electronic element is aligned concentric to the fiber core and fixed there, which makes possible an optimal coupling.

Wetting with an adhesive may occur on the butt side of the fiber only, on the protruding structure of the opto-electronic component only, or on both.

In accordance with another mode of the invention, the opto-electronic element is placed on the butt of the (perpendicularly aligned) fiber and then released, i.e., separated from outside holding components.

The element is disposed such that it floats on the butt of the fiber with the aid of the transparent adhesive and is borne by the adhesive. The element can, therefore, be displaced perpendicular to the rotational axis of the optical fiber. The relatively light element now moves relative to the butt side of the fiber under the effect of the surface tension of the adhesive and positions itself concentrically to the axis of the fiber. Under the influence of the surface tension, the surfaces of the adhesive form minimum areas, whereby the element (i.e., its rotationally symmetric protruding structure) is automatically centered.

It should be noted that, on principle, the invention can also provide that the element be borne in a floating fashion at a certain distance from the butt of the fiber by a holding device—which engages the lateral ends of the element, for example—in that the adhesive already fills the intermediate space between the protruding structure or the fiber. Here, a movement of the element perpendicular to the rotational axis of the fiber is, likewise, possible due to the floating bearing so that a centered alignment of the element can occur under the influence of the surface tension. Such a solution makes sense particularly when the element is too heavy to be placed completely on the butt of the fiber; i.e., the adhesive would not be able to bear it due to its weight.

The protruding rotationally symmetric structure can take several forms. In accordance with a further mode of the invention, a mesa structure with a substantially planar surface is provided. The protruding structure can also advantageously be cylindrical because, in such a case, it has the same symmetry as in the fiber with which it is to be coupled. Furthermore, the protruding structure has a smaller diameter than the fiber to reliably guarantee a concentric centering. The opto-electronic element itself, preferably, has a diameter that corresponds to the diameter of the optical fiber or is larger or smaller by up to a factor of 2.

Alternatively, the protruding structure can also be formed by a ring structure, whereby the ring surrounds the optically active zone, containing it centrally. Likewise, the protruding structure can be an equilateral triangle, a square, a pentagon, or some other polygon.

In accordance with an added mode of the invention, the optical fiber has a flat butt. But an optical fiber with a curved butt can also be used as the optical fiber, whereby the butt acts to shape the beam (what is referred to as a lensed fiber).

In accordance with an additional mode of the invention, the coupling region between the fiber and the opto-electronic transducer and/or adjoining regions are coated with a casting compound. Such a configuration serves as protection against outside influences and provides additional mechanical stability.

The inventive surface-oriented opto-electronic element is characterized by a rotationally symmetric protruding structure that is formed at the element symmetrical to the optically active zone.

In accordance with yet another mode of the invention, the element is fastened to a PCB after being coupled with the fiber to face an optically active zone of the element towards the PCB and to avert the protruding structure from the PCB.

In accordance with yet a further mode of the invention, the element is fastened to a PCB after being coupled with the fiber to avert an optically active zone of the element and the protruding structure from the PCB.

In accordance with yet an added mode of the invention, the surface-oriented opto-electronic element is one of a VCSEL laser diode, an LED, and a photodiode.

With the objects of the invention in view, there is also provided an opto-electronic structure, including a surface-oriented opto-electronic element having a substrate with a surface region and an optically active zone formed at the surface region, and a rotationally symmetrical protruding structure connected to the substrate and symmetrically disposed with respect to the optically active zone.

In accordance with yet an additional feature of the invention, the optically active zone is formed in the surface region.

In accordance with again another feature of the invention, the protruding structure is formed at the surface region.

It falls within the scope of the invention either that the protruding structure is realized on the same surface as the optically active zone, or that the protruding structure is realized opposite the surface with the optically active zone.

In accordance with again a further feature of the invention, the optically active zone is formed at a given surface and the protruding structure is formed on the given surface.

In accordance with again an added feature of the invention, the substrate has an opposing surface opposite the surface region and the protruding structure is formed at the opposing surface.

In accordance with a concomitant feature of the invention, the substrate has a given surface and an opposing surface opposite the given surface, the optically active zone is formed at the given surface, and the protruding structure is formed on the opposing surface.

Other features that are considered as characteristic for the invention are set forth in the appended claims.

Although the invention is illustrated and described herein as embodied in a method for coupling a surface-oriented opto-electronic element with an optical fiber and opto-electronic element for carrying out such a method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 6 is a fragmentary, diagrammatic illustration of an optically transparent adhesive coupling an opto-electronic element on a PCB with an optical fiber according to the invention;

FIG. 7 is a fragmentary, diagrammatic illustration of an alternative embodiment of the optically transparent adhesive coupling between an optical fiber having a curved end face and an opto-electronic element according to the invention; and FIG. 8 is a fragmentary, diagrammatic illustration of a further embodiment of the optically transparent adhesive coupling between an opto-electronic element having an optically active region located on a substrate side and an optical fiber according to the invention.

DESCRIPTION OF THE PREFERRED EMBODIMENTS

Figure 1:
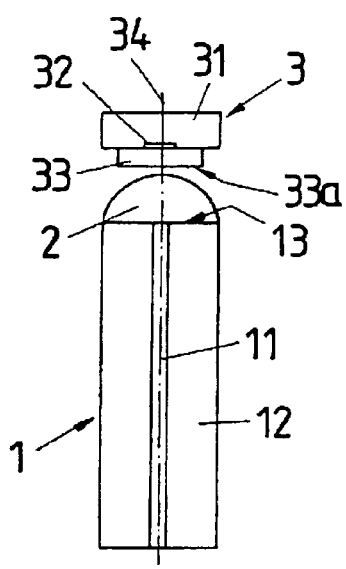
FIG. 1 is a fragmentary, diagrammatic illustration of an opposing configuration of an optical fiber and an opto-electronic element with a transparent adhesive wetting at the butt of the optical fiber according to the invention.

Referring now to the figures of the drawings in detail and first, particularly to FIG. 1 thereof, there is shown an optical fiber 1, which includes a fiber core 11 and a fiber cladding 12, disposed vertically in the gravitational field of the earth. The fiber 1 can be either a monomode (single mode) fiber or a multimode fiber, whereby, preferably, a monomode fiber is utilized, for which coupling with an opto-electronic element is particularly difficult due to the small core diameter. Typical dimensions of the fiber 1 are as follows: For a multimode fiber, the diameter is preferably 125–250 μm and the core diameter is preferably 50–62.5 μm. For a single mode fiber, the core diameter is usually between 7 and 10 μm given the same overall diameter.

In the exemplifying embodiment of FIG. 1, the end surface of the fiber 1, i.e., its butt, is flat. But it can also be curved, as will be described in connection with FIG. 7.

Opposite the butt 13 of the optical fiber 1 is an opto-electronic element 3, hereinafter opto-chip, which has a similar diameter as the fiber 1. It is preferably a surface-oriented opto-chip that forms an optically active zone at one of its surfaces. Examples of such opto-chips are a VCSEL laser diode, an LED, or a photodiode.

According to FIG. 1, the opto-chip 3 has a substrate 31 on which an optically active zone 32 is constructed on the side allocated to the optical fiber 1. Such opto-chips are in the prior art. The opto chip 3 additionally has an elevated or protruding structure 33 that is rotationally symmetric and symmetric relative to the active zone 32. The protruding structure 33 is located on the output side (VCSEL, LED) or the input side (LED) of the opto-chip 3. The opto-chip 3 is, thus, constructed such that the active emission or absorption surface 32 of the chip is located in the middle of the protruding structure 33. In other words, the protruding structure 33 and the optically active zone 32 are both realized rotationally symmetrical to a common rotational axis 34, which also represents the rotational axis of the opto-chip 3.

The protruding structure 33 in this exemplifying embodiment is a cylindrical mesa structure that is formed on the optically active zone and whose surface 33a facing the optical fiber 1 is flat. But it is also possible for the protruding structure 33 to take a different shape, whereby a convexly or concavely curved surface can be provided to achieve beam shaping. What is important is that the protruding structure 33 be rotationally symmetrical and symmetrically configured relative to the optically active zone 32 of the element 3.

Because the protruding structure 33 lies partly on the optically active zone 32, it is optically transparent for the applied wavelengths of light. The protruding structure 33 is, preferably, produced together with the opto-chip 3 in planar technology. For example, it is of silicon that is transparent to wavelengths above 800 nm.

It is also noted that the protruding structure 33 need not necessarily be solid. A protruding structure that is formed merely in a surrounding margin region symmetrical to the opto-electrical zone, for instance, a ring structure, also falls within the scope of the invention.

In a first step of the method, for purposes of coupling, connecting, and simultaneously aligning optical fiber 1 and opto-chip 3, a transparent adhesive is applied to the butt 13 of the optical fiber, forming a spherical adhesive cap 2 that attempts to form a minimum surface due to the surface tension.

Figure 2:
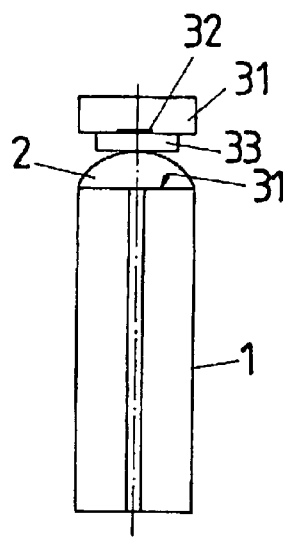
FIG. 2 is a fragmentary, diagrammatic illustration of the configuration of FIG. 1 with the opto-electronic element placed on the transparent adhesive.

According to FIG. 2, in a second step, the opto-coupler 3 and the fiber 1 are positioned opposite one another such that the protruding structure 33 of the opto-chip comes in contact with the spherical adhesive cap 2. To such an end, the chip 3 is placed on the spherical adhesive cap 2 and is, then, released. Thus, it floats freely on the adhesive 2.

Figure 3:
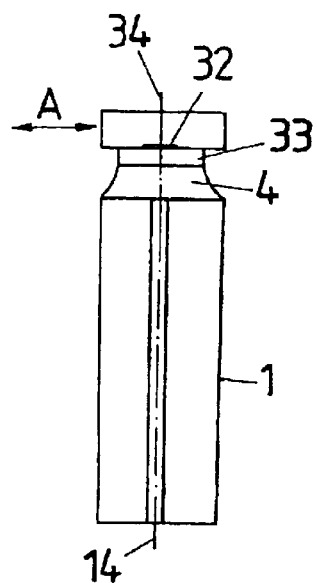
FIG. 3 is a fragmentary, diagrammatic illustration of a self-centering of the opto-electronic element relative to the optical fiber in the configuration of FIGS. 1 and 2.

According to FIG. 3, a region 4 that is filled with the optically transparent adhesive forms between the protruding structure 33 of the opto-chip 3 and the butt 13 of the optical fiber. The opto-chip 3 can move in a direction A perpendicular to the longitudinal, i.e., rotational, axis 14 of the optical fiber 1. As a result, the opto-chip 3 and the optical fiber 1 can align themselves to one another.

Alignment, therefore, occurs automatically based upon the surface tension and the capillary effect of the adhesive, with the rotational axis 34 of the optically active zone 32 (i.e., of the opto-chip 3) moving into congruence with the rotational axis 14 of the optical fiber 1; i.e., the optically active zone 32 of the opto-chip becomes positioned precisely opposite the core 11 of the optical fiber 1. As such, an optimal coupling performance between the element 3 and the optical fiber 1 is provided.

After the successful positioning, the adhesive hardens with the passage of time or under the influence of infrared radiation, for example, so that the resulting optimal alignment is fixed, and a permanent connection between the opto-chip 3 and the optical fiber 1 is provided. The coupling process is, thus, complete.

Figure 4:
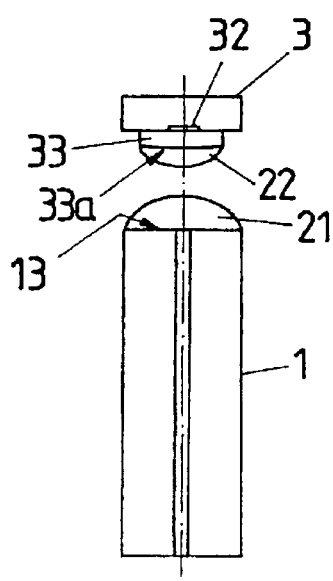
FIG. 4 is a fragmentary, diagrammatic illustration of the configuration of FIGS. 1 and 2 with a spherical adhesive cap formed on both the opto-electronic element and the optical fiber.
Figure 5:
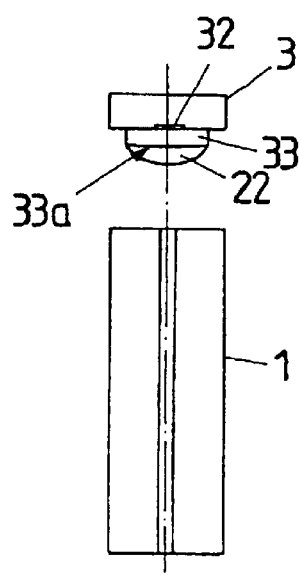
FIG. 5 is a fragmentary, diagrammatic illustration of the configuration of FIGS. 1 and 2 with a spherical adhesive cap formed only on the opto-electronic element.

According to FIGS. 4 and 5, it falls within the scope of the invention either that a spherical adhesive cap 21, 22 is formed both on the butt 13 of the optical fiber 1 and on the surface 33a of the protruding structure 33 of the opto-chip 3 (FIG. 4), or that a spherical adhesive cap 22 is formed only on the surface 33a of the protruding structure 33 of the opto-chip (FIG. 5). What is important is that a region in which the transparent adhesive is provided, initially in the liquid state, develops in the region of the protruding structure 33 and the butt 13 of the optical fiber.

The optimal diameter of the centering structure 33 on the opto-chip 3 depends on the precise characteristics of the adhesive and the radius of the spherical cap. Preferably, the centering structure has a diameter of between 10 and 100 μm given edge lengths of the overall chip 3 in the range from 150 to 500 μm.

FIG. 6 represents an exemplifying embodiment wherein the opto-chip 3 that is mounted on the fiber end is mounted on a PCB 6 by solder bumps 5. To that end, the opto-chip 3 has backside contacting (not explicitly represented). The overall configuration can be clad with a suitable casting compound as protection against dirt or other environmental influences and for mechanical stabilization. It can also be provided that only the adhesive region between optical fiber 1 and opto-chip 3 is coated with a casting compound, which provides the connection with additional mechanical stability.

FIG. 7 represents an exemplifying embodiment in which a fiber-chip coupling is performed with an optical fiber 1 that is curved at its butt side and, thus, forms a lens 15. Such a configuration is also referred to as a lensed fiber. The method of functioning of the joint between the fiber and opto-chip does not change from that set forth herein.

Lastly, FIG. 8 represents an exemplifying embodiment wherein, unlike the exemplifying embodiments of FIGS. 1 to 7, the protruding structure 33 of the opto-chip 3 is disposed not on the same side of the substrate 31 of the opto-chip 3, but, rather, on an opposite side 35. Upon placing the opto-coupler 3 at a PCB according to FIG. 6, the light-emitting and light-receiving opto-chip 3 with its optically active surface is aligned on the substrate side. Such an embodiment shows that what matters with respect to configuring a protruding structure at the opto-electronic element is solely that the protruding structure 33 is disposed symmetrically (i.e., centered) relative to the optically active surface 32.

The invention is not limited in its embodiment to the foregoing exemplifying embodiments. What is important is solely that an optical fiber and an opto-electronic element that is to be coupled therewith are joined to one another by an optically transparent adhesive and with self-centering.

We claim:

1. A method of coupling an element with a fiber, which comprises:
   providing an optical fiber having a fiber rotational axis and a fiber butt;
   providing a surface-oriented opto-electronic element having:
      an optically active zone;
      a rotational axis; and
      a rotationally symmetric protruding structure symmetrically disposed with respect to the optically active zone;
   wetting at least one of the fiber butt and the protruding structure with a transparent adhesive;
   moving the element and the optical fiber toward each other to spread the adhesive therebetween;
   disposing at least one of the element and the fiber to enable a substantially frictionless movement of the fiber perpendicular to the rotational axis of the element and perpendicular to the fiber rotational axis;
   waiting for the fiber and the protruding portion to self-center; and
   one of waiting for and bringing about a hardening of the adhesive to fix the now-centered configuration between the fiber and the protruding portion.

2. The method according to claim 1, which further comprises placing the element on the fiber butt and then releasing the element.

3. The method according to claim 1, wherein the protruding structure of the element is a mesa structure having a substantially flat surface.

4. The method according to claim 1, wherein the protruding structure of the element is a cylindrical protruding structure.

5. The method according to claim 1, wherein the protruding structure of the element is a ring structure.

6. The method according to claim 1, wherein the fiber butt is substantially flat.

7. The method according to claim 1, wherein the fiber butt is curved.

8. The method according to claim 1, which further comprises:
   providing an opto-electronic transducer as the element; and
   coating a coupling region between the fiber and the transducer with a casting compound.

9. The method according to claim 1, wherein the element is an opto-electronic transducer, the fiber and the transducer define a coupling region therebetween, and the coupling region has adjoining regions, and which further comprises coating at least one of the coupling region and the adjoining regions with a casting compound.

10. The method according to claim 1, which further comprises fastening the element to a PCB after being coupled with the fiber to face an optically active zone of the element towards the PCB and to avert the protruding structure from the PCB.

11. The method according to claim 1, which further comprises, after coupling the fiber with the element, fastening the element to a PCB to orient an optically active zone of the element facing the PCB and to avert the protruding structure from the PCB.

12. The method according to claim 1, which further comprises, after coupling the fiber with the element, fastening the element to a PCB to orient an optically active zone of the element facing the PCB and to avert the protruding structure at an angle away from the PCB.

13. The method according to claim 1, which further comprises fastening the element to a PCB after being coupled with the fiber to avert an optically active zone of the element and the protruding structure from the PCB.

14. The method according to claim 1, which further comprises, after coupling the fiber with the element, fastening the element to a PCB to avert an optically active zone of the element and the protruding structure from the PCB.

15. The method according to claim 1, which further comprises, after coupling the fiber with the element, fastening the element to a PCB to avert an optically active zone of the element and the protruding structure at an angle away from the PCB.

16. The method according to claim 1, wherein the surface-oriented opto-electronic element is one of a VCSEL laser diode, an LED, and a photodiode.

* * * * *